UNITED STATES PATENT OFFICE.

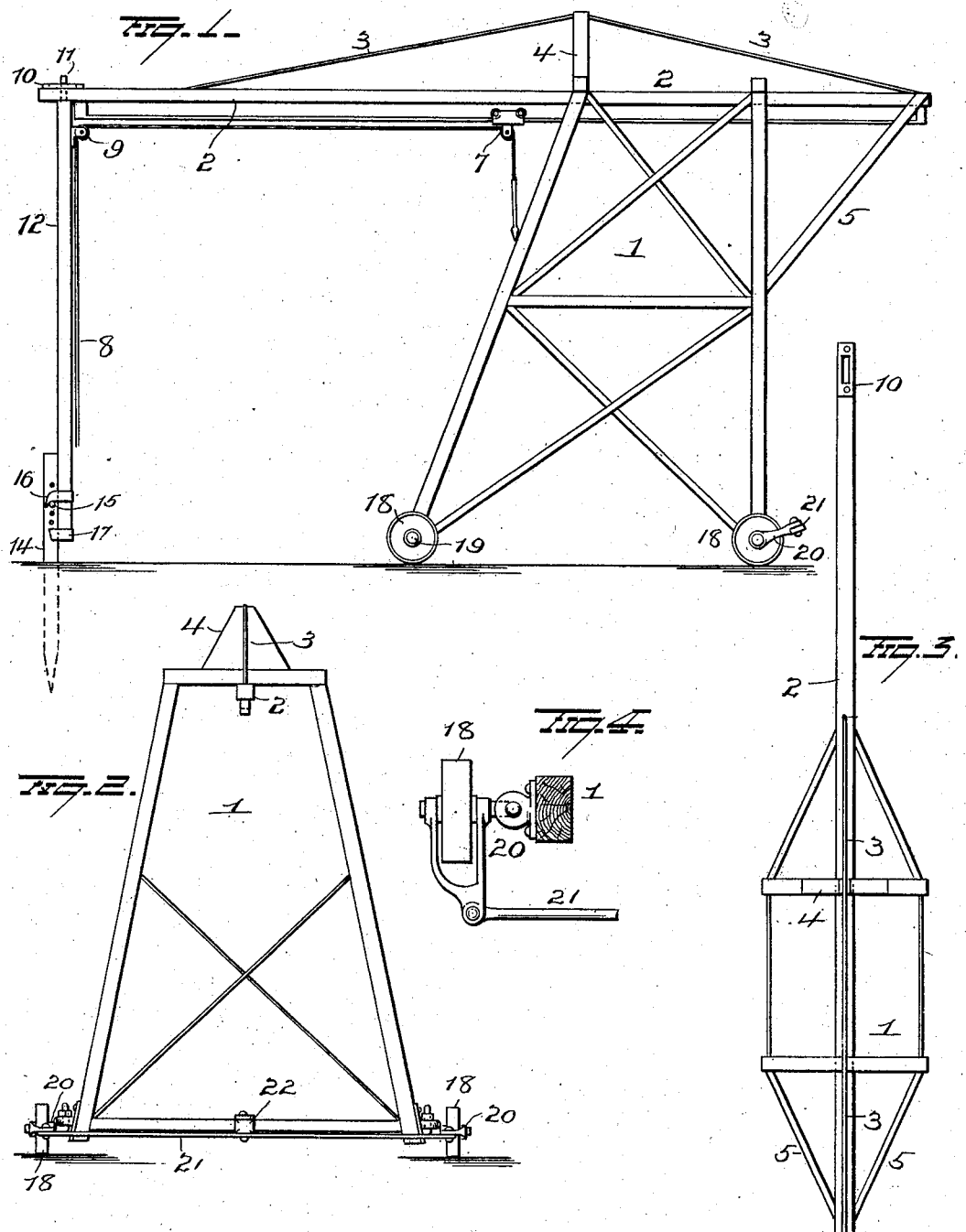

CHARLES J. DLOUHY, OF CLARKSON, NEBRASKA.

HAY STACKER AND LOADER.

No. 827,219.   Specification of Letters Patent.   Patented July 31, 1906.

Application filed September 18, 1905. Serial No. 278,976.

*To all whom it may concern:*

Be it known that I, CHARLES J. DLOUHY, of Clarkson, in the county of Colfax and State of Nebraska, have invented certain new and useful Improvements in Hay Stackers and Loaders; and I do hereby declare the following to be a full, clear, and exact description of the invention, such as will enable others skilled in the art to which it appertains to make and use the same.

My invention relates to improvements in hay-stackers, and more particularly to improved loading and unloading apparatus, the object of the invention being to provide an improved apparatus of this character of simple inexpensive construction which can be readily moved from place to place; and the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is an end view. Fig. 3 is a top plan view, and Fig. 4 is an enlarged detail view.

1 represents a tower composed of uprights and braces, as shown, and supporting in the center of its open top one end of a long horizontal bar 2, strengthened by a brace rod or wire 3, secured at its ends to bar 2 and passed over a short standard 4 at the top of tower 1 and braced at one end by inclined braces 5. While tower 1 is provided with transverse diagonal braces at its lower portion, its upper portion is left clear to provide a free passage for the load and the under side of bar 2, or the bar 2 is made in the form of a track on which a suitable hay-fork carrier 7 is mounted to run and support the load. A rope or cable 8 is connected to the hay-fork and passes over pulley 9 at the end of the bar 2 for the manipulation of the hay-fork. On the free or long end of bar 2 a casting 10 is secured, having an angular slot therein to receive an angular T-lug 11 on the upper end of pole 12, and when said lug 11 is inserted in the slot and the pole turned it will be effectually secured to the bar.

14 is a post to be driven in the ground and is made with a series of holes to receive in any of them pins 15, and the pole 12 at its lower end has arms 17 to engage the sides of the post and above its lower end is provided with hooked arms 16 to engage over pins 15 and secure the pole at any height, thus enabling the bar 2 to be supported level regardless of the contour of the ground.

The tower 1 is supported on wheels 18, two of which are mounted upon a fixed axle 19, and the other two at the outer or forward end of the tower are mounted in hinged brackets 20, said brackets 20 being connected by rods 21 to a central tongue 22, which compels the brackets to swing together and steer the apparatus when being conveyed from place to place.

In stacking a load or sweep full of straw is hauled to the tower end of bar 2, and the hay-fork is fastened to it, and by manipulation of the rope or cable 8 the hay-fork is moved to any convenient point on bar 2 and the load dropped onto the stack. The fork is then drawn back to the starting-point and the operation repeated. In loading a wagon the tower is moved to the stack and the wagon located below the long end of bar 2 between tower 1 and post 14 and the fork operated as above explained to move the hay or straw from the stack and load it onto the wagon.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A hay stacker and loader comprising an open-framework tower constructed to receive a body of hay therein, wheels on which said tower is mounted, a bar in the upper portion of the tower and extending a distance therefrom, a trackway on said bar, a pole removably secured to the outer end of said bar, a post to be anchored in the ground, and means for adjustably supporting the pole on the post.

2. In an apparatus of the character described, the combination of a tower, wheels supporting the same, a horizontal bar secured to the upper end of the tower and extending outward therefrom, a post to be inserted in the ground, adjustable pins on opposite sides of the post, a pole connected at its upper end to the outer end of the bar, arms on the lower end of the pole to receive the post between them, and hooked arms on the pole to engage behind the pins and secure the pole at any adjustment.

In testimony whereof I have signed this specification in the presence of two subscribing witnesses.

CHARLES J. DLOUHY.

Witnesses:
J. M. MUNDIL,
NETTIE A. AKSAMIT